United States Patent [19]
Hazenbroek et al.

[11] Patent Number: 6,024,636
[45] Date of Patent: Feb. 15, 2000

[54] EXPANDABLE POULTRY DEBONER HAVING A PRE-CUT INSTALLATION

[75] Inventors: Jacobus E. Hazenbroek, Klaaswaal; Leendert Izaak Van Vark, Puttershoek; Floris Wols, Rotterdam, all of Netherlands

[73] Assignee: Systemate Holland B.V., Numansdorp, Netherlands

[21] Appl. No.: 08/988,752

[22] Filed: Dec. 11, 1997

Related U.S. Application Data

[63] Continuation-in-part of application No. 08/782,876, Jan. 14, 1997, Pat. No. 5,782,685
[60] Provisional application No. 60/010,450, Jan. 23, 1996.

[51] Int. Cl.$^7$ .......................... A22C 17/04; A22C 21/00
[52] U.S. Cl. ........................................... 452/138; 452/136
[58] Field of Search ..................................... 452/138, 135, 452/136

[56] References Cited

U.S. PATENT DOCUMENTS

| | | |
|---|---|---|
| 3,456,284 | 7/1969 | Werner et al. . |
| 3,470,581 | 10/1969 | Hopkins ................................... 452/136 |
| 3,672,000 | 6/1972 | Martin et al. . |
| 4,327,463 | 5/1982 | Martin . |
| 4,377,884 | 3/1983 | Viscolosi . |
| 4,380,849 | 4/1983 | Adkison et al. . |
| 4,446,600 | 5/1984 | Hooley et al. . |
| 4,488,332 | 12/1984 | Atteck et al. . |
| 4,495,675 | 1/1985 | Hill et al. . |
| 4,736,492 | 4/1988 | Hazenbroek et al. . |
| 4,811,456 | 3/1989 | Heuvel . |
| 4,843,682 | 7/1989 | Bowen . |
| 4,944,067 | 7/1990 | Kulishen et al. ......................... 452/138 |
| 5,064,403 | 11/1991 | Elsten ....................................... 452/135 |
| 5,090,940 | 2/1992 | Adkison .................................. 452/136 |
| 5,173,076 | 12/1992 | Hazenbroek ............................ 452/135 |
| 5,277,649 | 1/1994 | Adkison .................................. 452/138 |
| 5,782,685 | 7/1998 | Hazenbroek et al. .................. 452/138 |

OTHER PUBLICATIONS

Dapec, Inc. Service Manual for FA33500 Thigh Deboner, D–30; FA33510 Thigh Deboner, D–40; FA33520 Thigh Deboner, D–50.

*Primary Examiner*—Willis Little
*Attorney, Agent, or Firm*—Thomas, Kayden, Horstemeyer & Risley

[57] ABSTRACT

Poultry drumsticks (13) are placed on carrier trays (22) of a tray conveyor (14) and move on an endless loop conveyor first through a rectilinear loading run (24), then through a precutting run, then a curved deboning run (26), and then through a lower return run (25). The pre-cutting run involves pre-cutting separate drumsticks of poultry, especially turkeys, with a pre-cutting device 110 in preparation of its deboning, comprising means to transversely cut the muscular tissue, especially tendons, at or near their connection to the drumstick bone. The curved deboning run extends about the deboning unit (35), which includes a stationary cam drum (36) and a revolving carrier assembly (38) that carries the series of deboning modules (55) about the drum (36). Each deboning module becomes aligned with a carrier tray and is actuated by the cam tracks (81) of the stationary cam drum (36) so as to engage and push the bone of the poultry drumstick through the aperture (63) of a stripper disk (61).

18 Claims, 8 Drawing Sheets though the deboning machine just described can work reliably when filleting most parts of legs (three pieces) and wings (two pieces), occasional difficulties occur when fil-

EXPANDABLE POULTRY DEBONER HAVING A PRE-CUT INSTALLATION

CROSS-REFERENCE TO RELATED APPLICATIONS

This Application is a Continuation-in-Part of U.S. patent application Ser. No. 08/782,876, filed on Jan. 14, 1997, now U.S. Pat. No. 5,782,685, which claims priority with respect to U.S. Provisional Application Ser. No. 60/010,450, filed Jan. 23, 1996.

FIELD OF THE INVENTION

The present invention relates in general to a method and apparatus for removing the bones from poultry and animal parts. More particularly, the present invention relates to a method and apparatus for deboning turkey drumsticks by using a pre-cut device and thereafter urging the drumstick bone longitudinally with respect to the meat and stripping the meat from the bone.

BACKGROUND OF THE INVENTION

In the processing and preparation of parts of poultry and animals such as poultry thighs and drumsticks for sale and consumption in the retail market, such as in restaurants and grocery stores, it is highly desirable to package and serve the meat with the bones removed. Deboned meat can be easily cut-up and used in sandwiches or other food products where it is desirable to have the bones previously removed prior to cooking and serving.

An additional advantage of removing the bones from the meat during processing and before cooking is that the bones do not have to be cooked with the meat, thereby conserving heat energy. Further, the removal of the bone prior to cooking allows the bone to be saved and used for bone meal or related products.

In the past, automated processes have been developed for the removal of meat from the bone of a poultry part, such as from the bones of a poultry thigh and/or drumsticks, by engaging the bone with a scraping tool and scraping along the length of the bone. For example, U.S. Pat. Nos. 3,672,000, 4,327,463, 4,495,675, and 4,736,492 disclose deboning apparatus having two or more notched scraping blades which engage the bone. The blades are closed about the bone with the notches of the blades straddling the bone, and the bone is moved longitudinally through the blades. As the bone is moved through the notched blades, the blades progressively scrape the meat from the bone.

However, the raw meat has a tendency to cling tightly to the bone. Consequently, it is necessary for the scraper blades to engage the bones in tight frictional contact to ensure the meat is completely scraped from the bone. A problem that arises with such prior art deboners is that the blades engaging the bone sometimes inadvertently gouge or chip and sometimes crack the bones as they scrape the bones. This creates bone fragments that can become lodged in the stripped meat, which creates a serious health risk to the ultimate consumer who expects that when he or she purchases a "boneless" product, it is indeed completely boneless.

In order to avoid the creation of bone fragments during the deboning process, apertured elastic meat stripper disks have been substituted for the scraper blades. The bone is pushed longitudinally through the aperture of the disk and the resilient disk retards the movement of the meat, thereby separating the meat from the bone. U.S. Pat. No. 4,811,456 teaches the use of such elastic disks.

Additionally, U.S. Pat. No. 5,173,076 discloses an automated deboning apparatus which includes a series of elastic stripping disks, each of which is mounted adjacent and moves with a conveyor tray on which a poultry part is received and moved about a processing path. As the poultry part is moved along the processing path, the bone is urged through openings in the stripper disks, whereupon the meat is progressively stripped from its bone. Such a system is, however, limited in size and in the number of deboning modules included therewith, which limits the production capacity of the apparatus. Conventional deboning apparatus also generally are not readily expandable to increase the number of parts that can be processed as needed.

As outlined above, the U.S. Pat. Nos. 3,672,000, 4,327,463, 4,495,675, 4,736,492, 4,811,456 and 5,173,076 describe devices for deboning wing or leg parts such as thighs and drumsticks, provided with scrapers or discs defining an aperture through which the part to be deboned passes, thereby scraping off the meat from the bone. Other similar filleting devices are available on request under the type designation MK40, MK80, 025, D30, D40 and D90. These automatic machines work with the aid of the so-called diaphragm-principle, whereby the bone is pushed out of the meat with the aid of a pin.

Applicants' as yet unpublished European patent application 97.200.019.4, (the contents of which shall be deemed incorporated by reference herein) and U.S. patent application Ser. No. 08/782,876, filed Jan. 14, 1997, (the contents of which shall be deemed incorporated by reference herein) describe an improved deboning device for legs, particularly thighs and drumsticks of big birds, such as turkeys. This device includes a chain conveyer revolving in a vertical plane, provided with a series of, in the direction of conveyance, transversely placed carrier trays for holding the poultry legs. In the deboning process, a pusher rod pushes the leg, while lying on the tray, against a scraping disc. Subsequently the pusher rod is further advanced in transverse direction to force the bone in a diaphragm manner through an aperture in the scraping disc. The meat is then retained between the scraper disc and the sleeve. After the meat has been separated from the bone in this manner, the trays are transported back to the small gear wheel along the lower run, to be returned to the loading track.

Although the deboning machine just described can work reliably when filleting most parts of legs (three pieces) and wings (two pieces), occasional difficulties occur when filleting drumsticks of big birds, such as turkeys. The reason for the difficulty is that the connection between muscular tissue and bone is such that scraping along the bone is insufficient to completely separate the meat from the bone. In an attempt to remedy this problem, most poultry processing operators make an incision by hand during loading. This, however, is a complicating factor to the entire process which thus takes more time. Correspondingly, the cost of the poultry increases. Moreover, the act of incision creates a potential risk of injury for the operator. Also, there is great room for inconsistency or error.

Accordingly, it can be seen that it would be highly desirable to provide a method and apparatus for cleanly and completely scraping the meat from the drumsticks of large birds, such as poultry, without the complication of cutting the part during loading, and with the apparatus being expandable to enable a greater quantity of poultry parts to be processed.

SUMMARY OF THE INVENTION

Briefly described, the present invention comprises an improved method and apparatus for removing the meat from the leg parts, particularly drumsticks, of poultry, such as turkeys, chickens or similar animal parts. In a preferred embodiment of the invention, a poultry drumstick deboner includes an elongated continuous tray conveyor having a series of poultry drumstick carrier trays mounted thereon and moved about a substantially endless loop processing path. The preferred embodiment also comprises a pre-cut device and a deboning device sequentially along the processing path of the tray conveyor.

Each carrier tray is preferably shaped as a channel for receiving and carrying a poultry drumstick as it is moved along its processing path. The poultry drumsticks are loaded into the trays as they are moved along an upper rectilinear run of the tray conveyor through the precut device and into the deboning unit.

The precut device comprises cutting means to transversely and circumferentially cut the muscular tissue at the bone of the drumstick. The muscular tissue at the lip of the bone will then come completely free from the bone which highly facilitates a secure scraping operation.

The precut device of the preferred embodiment includes a first cutting means for cutting the muscles at a first part of the bone circumference and second cutting means for cutting the muscles at a complementary second part of the bone circumference. In this way, a passage is left for the drumsticks, so that incision can take place during transportation of the drumsticks to the deboning device. The first cutting means are preferably located to at least engage the lower part of the bone circumference and the second cutting means are located to at least engage the upper part of the bone.

Preferably, the first and second cutting means are formed by two circular knives that, seen in the direction of transport, are placed in a vertical plane, off-set and adjacent to each other. Thus, seen in the direction of transport, the circular knives define a more or less "zig-zag" formed passage for a drumstick end part, which upon transportation via the knives are more or less cut automatically. Preferably, the knives are positioned in such a way that both knives cut through the same plane, which plane is parallel to the direction of the drumsticks and, in particular, is preferably a horizontal plane.

The preferred embodiment of a pre-cut device further comprises a guiding element located at a radial distance from at least one of the circular knives for pressing the drumstick against the respective circular knife. In this way, the pressure and duration of the engagement can be prolonged. Seen in the direction of transport, the first cutting means can be located upstream and positioned beneath the second cutting means whereby said guiding element is preferably located at the first cutting means. This engagement is further improved if the guiding element is biased by a tensioned spring towards the cutting means to a set minimal distance. Preferably, the guiding element extends over at least a part of that section of the circumference of the circular knife of the first cutting means that is facing the second cutting means. The guiding element preferably has a curvature which approximately equals the curvature of the circular knife.

The pre-cut device is designed to be a part of and directly precede a deboning device in which drumsticks (or other leg parts) of poultry, in particular turkeys, are being deboned. The deboning unit of the preferred embodiment includes a stationary cam drum having a pair of helical cam tracks extending thereabout, and a revolving carrier assembly which extends about the cam drum. The carrier assembly includes a pair of rotary end plates positioned at opposite ends of the cam drum, and which are rotatably mounted on an axle that extends through the cam drum. The end plates are rotated by a motor about the axle so as to rotate with respect to the cam drum. A series of travel rods are arranged in a cylindrical array about the cam drum, arranged in pairs mounted at their ends to the rotary end plates. A deboning module is movably mounted on a set of travel rods. Each deboning module includes a pusher assembly and an apertured meat stripper disk assembly which are aligned with each other and which are moved into alignment with a carrier tray of the tray conveyor and are rotated in timed relation with their carrier tray as the carrier tray is moved about the cam drum of the deboning unit.

The meat stripper disk assemblies are mounted to the end plate which is positioned adjacent the processing path for the carrier trays. Each meat stripper disk assembly includes a flexible stripper disk supported within a rigid collar that stabilizes and supports the stripper disk. An aperture is formed through the center of each stripper disk and receives the drumstick bones therethrough. As the drumstick bones pass through the apertures of the stripper disks, the meat is progressively stripped from the drumstick bones by the stripper disks. A guide is mounted behind each stripper disk, aligned with the aperture of each disk. The preferably circular guide receives and stabilizes the drumstick bones as they are urged through and beyond the stripper disks during a meat stripping operation.

The bone pusher assembly of each deboning module is mounted on and is laterally movable along the length of a pair of travel rods, initially positioned on the opposite side of each carrier tray from its aligned stripper disk. Each bone pusher assembly includes a hollow pusher sleeve having open front and rear ends, and which is mounted on a carrier block slidably attached to the travel rods. A cam follower is affixed to the bottom of the carrier block and engages and rolls along a first cam track formed about the circumference of the stationary cam drum of the deboner unit. As the cam follower engages and moves along its cam track, the pusher sleeve is moved into engagement with an adjacent knuckle of the bone of the poultry drumstick and urges the poultry drumstick toward its aligned meat stripper disk assembly, with the bone being urged through the aperture of the stripper disk.

A pusher rod is telescopically mounted within each pusher sleeve, extending along the length of its pusher sleeve. Each pusher rod has a tapered front end that telescopes into and out of its pusher sleeve to engage and urge the bone of a poultry drumstick through the stripper disk, and a rear end that extends outwardly from the rear end of its pusher sleeve. The rear ends of the pusher rods are each attached to and supported by a carrier block slidably mounted on the travel rods. A cam follower is attached to each carrier block of each pusher rod and engages a second cam track formed about the surface of the stationary cam drum and extending approximately parallel to the first cam track. As the cam follower of each pusher rod moves along the second cam track, the pusher rod is urged laterally through the pusher sleeve so that the rectangularly tapered front end of each pusher rod telescopes out of the pusher sleeve to engage and urge the bone of the poultry drumstick completely through the aperture of stripper disk to complete the stripping of the meat from bone. Upon completion of the removal of the meat from the bone, the meat and the bone drop away from the carrier trays and from the deboning modules for collection and further processing.

The construction of the present invention further enables the system to be expandable, by the addition of extra carrier trays to the tray conveyor to enable an increased quantity of poultry leg parts to be processed as needed. The elongated endless tray conveyor travels through a rectilinear loading path toward the revolving carrier assembly, and as the carrier trays move along the loading path, the poultry leg parts are placed in the trays, with the bone of each drumstick aligned with the tray. This arrangement permits a relatively small deboning unit to be combined with a relatively long conveyor for processing the drumsticks. If desired, the length of the conveyor, and therefore the length of the loading path, can be extended so that more than one operator can be stationed at the loading path for placing poultry drumsticks on the trays. However, only one deboning unit is required, regardless of the length of the loading path. The speed of revolution of the revolving carrier assembly of the deboning unit can be increased to accommodate more drumsticks being placed on the trays.

In the preferred embodiment, the precut device according to the invention is attached to the deboning equipment in such a manner that it can be brought outside the path of the parts to be deboned, if those parts are not drumsticks. The pre-cut station can thus be mounted on a separate, foldable or removable frame.

The cutting means will have to be arranged in such a way that they do not interfere with the conveyor, especially the supports for the parts or drumsticks. When feeding the trays with the drumsticks, care should be taken that the drumsticks extend beyond the tray, enough to be engaged by the cutting means. However, after having been incisioned, those protruding parts can interfere with parts of the filleting machine placed downstream, such as, e.g. the above-mentioned scraping knives and/or take too much space in a transverse direction.

In order to provide a solution to this problem, the invention provides a filleting apparatus as mentioned above further provided with means for slidably moving part of a leg, especially a drumstick, in the tray from a laterally protruding position to a withdrawn, or hardly protruding position. Further, the conveyor is provided with means to operate the displacement means, arranging that the occupied space in transverse direction at the sliding means is limited. With regard to the conveyor, the displacement means are preferably positioned stationary and provided with a plate, pivotable between an outwardly titled, nonactive position and an inwardly tilted, active position.

The supports are each advantageously provided with an operating means for the pivotable plate, whereby the pivotable plate has been located in such a way that it can pivot under the influence of gravity, from an active to a non-active position, For that purpose the swivel plate is preferably provided with an upturned end part for preventing the drumstick from upward movement relative to the support.

Thus, it is an object of this invention to provide an improved method and apparatus for reliably and expediently removing the meat from the bones of poultry drumsticks or similar animal parts.

A further object of this invention is to provide a precut device such that the drumsticks are pre-cut in such a way that scraping the meat off the bone can take place in a reliable manner.

Another object to this invention is to provide a method and apparatus for removing the meat from the bones of poultry drumsticks and similar animal parts with reduced risk of chipping the bones and creating bone fragments within the meat and reduced risk of operator injury from necessary manual incisions.

Another object of the invention is to provide an improved automated poultry drumstick deboner which uses a relatively small deboning unit to process drumsticks received from a relatively long conveyor system.

Another object to this invention is to provide an automated poultry deboner for reliably removing the meat from the bones of poultry drumsticks and similar animal parts, with the apparatus being expandable so as to enable more carrier trays to carry more poultry parts through the process.

Various other objects, features and advantages of the present invention will become apparent to those skilled in the art upon reading the following specification when taken in conjunction with the accompanying drawings.

BRIEF DESCRIPTION OF THE DRAWINGS

The invention shall now be explained with the aid of the accompanying drawings, in which.

DETAILED DESCRIPTION OF THE PREFERRED EMBODIMENTS

Figure 1:
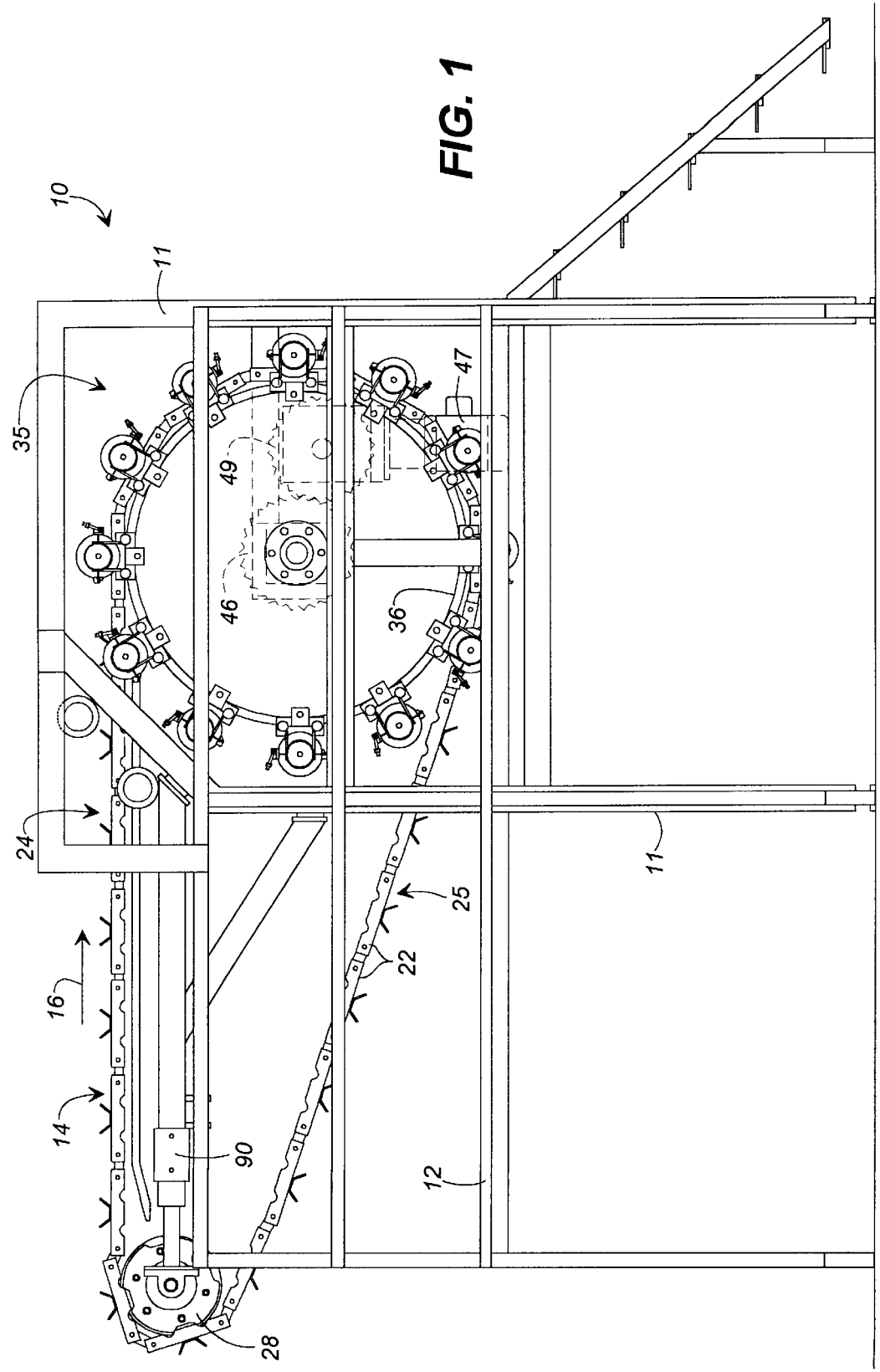
FIG. 1 is a side elevational view of a filleting apparatus for drumsticks of poultry, wherein a pre-cut station is included.
Figure 2:
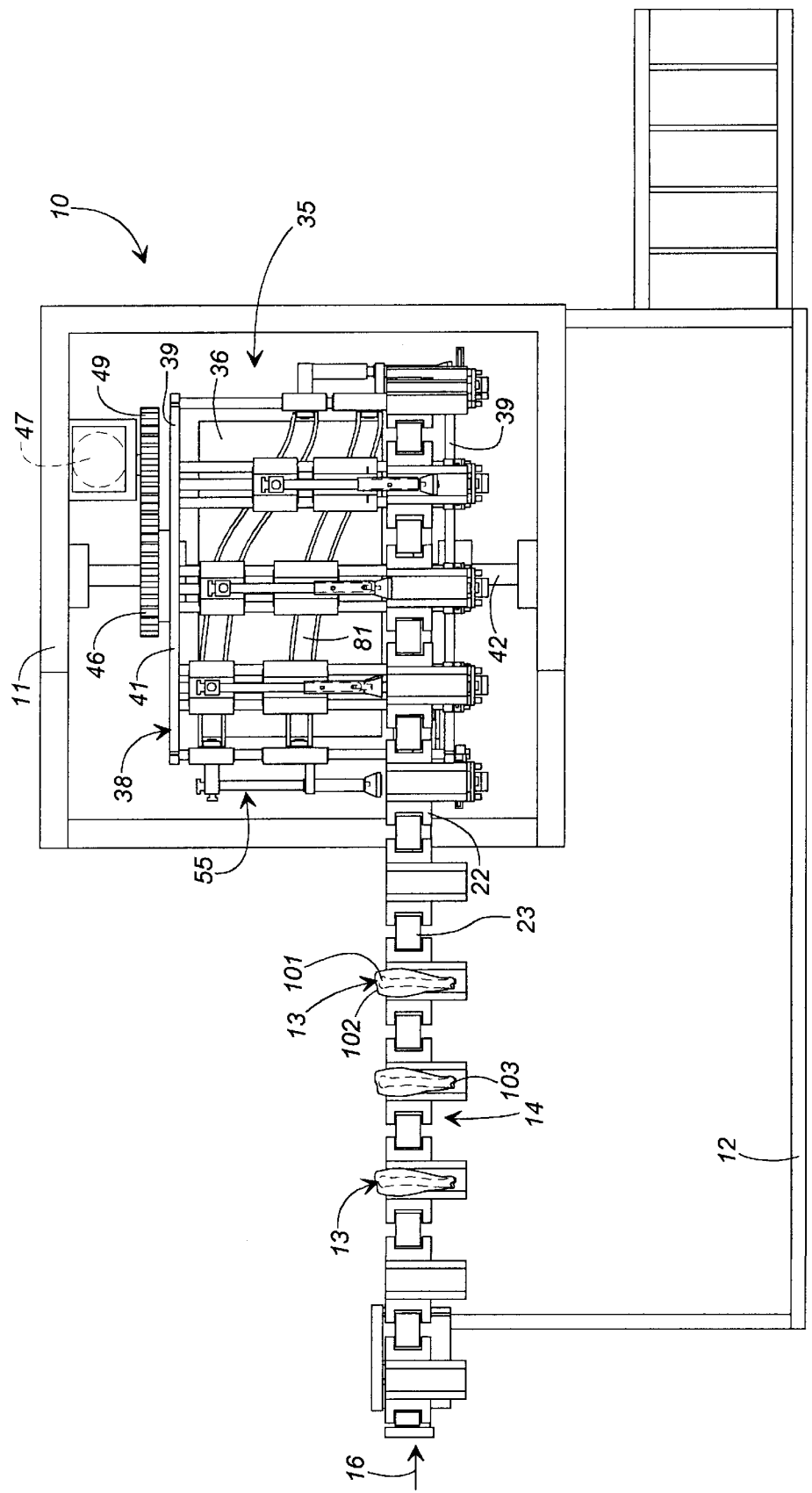
FIG. 2 is a plan view of the poultry drumstick deboner of FIG. 1.
Figure 3:
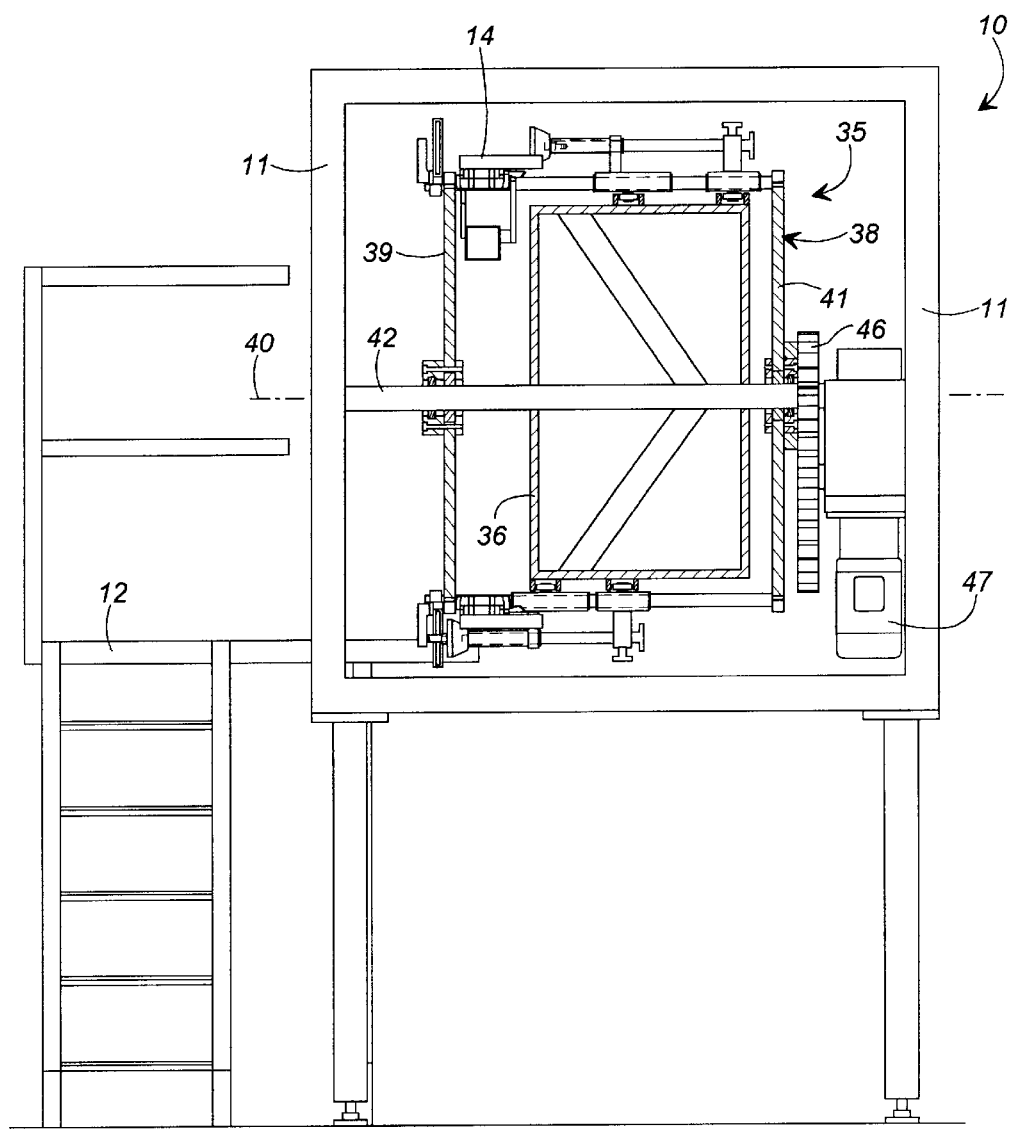
FIG. 3 is an end view of the poultry drumstick deboner of FIG. 1, taken in partial cross-section.

Referring now in greater detail to the drawings in which like numerals indicate like parts throughout the several views, FIGS. 1–3 illustrate the deboning device 10 which includes a supporting framework 11 with an operator's platform 12 mounted thereto. The operator's platform 12 is positioned adjacent and generally in front of the supporting framework 11, attached thereto preferably by welding. The framework 11 and the operator platform 12 are typically constructed of steel or other sturdy metal material. The platform 12 provides a place for one or more workers (not shown) to stand while loading poultry parts, in this case turkey drumsticks 13 (FIG. 2) onto a continuous tray conveyor chain 14 of the deboning device 10 for movement along a processing path 16 for deboning the poultry parts, particularly drumsticks 13.

As FIGS. 1, 2 and 7–10 illustrate, the tray conveyor 14 is a substantially endless loop conveyor that includes a series of tray base elements 22 connected in series by linkages or couplings 23 and extended in a substantially endless loop along the processing path 16. As shown in FIG. 1, the tray conveyor 14 includes an upper rectilinear inspection path, or loading 24 and a lower return path 25 and a curved filleting, or deboning path 26. An idler sprocket 28 is mounted between the upper insertion path 24 and the lower return path 25 adjacent a loading end of the tray conveyor chain 14, with the tray conveyor chain 14 extending thereabout for guiding the tray conveyor chain 14 upwardly and over and along its upper run. Although the present invention is not limited to a particular conveyor speed, the conveyor chain 14 typically travels at a speed of 40 links per minute.

Figure 7:
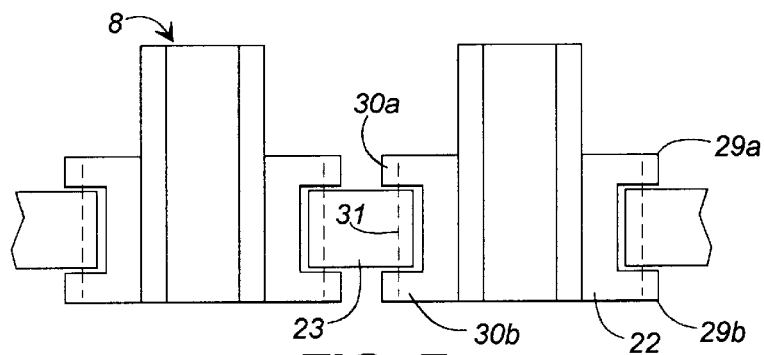
FIG. 7 is a top view of adjacent carrier trays.
Figure 8:
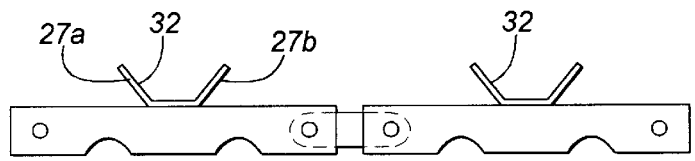
FIG. 8 is a side view of adjacent carrier trays.
Figure 9:
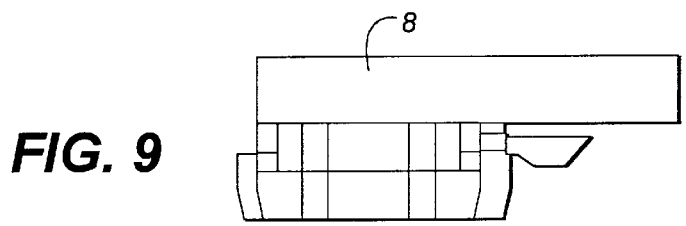
FIG. 9 is an end view of a carrier tray.

As shown in FIG. 7, a preferred embodiment for a tray conveyor chain 14 comprises generally a carrier tray 8, a tray base element 22, and a linkage 23. The oblong tray 8 is generally formed of stainless steel or other metal material. Such a tray 8 preferably comprises a drumstick resting surface 32 and opposed walls 27*a*, 27*b* for preventing the drumstick 13 from rolling out of the tray 8. A bottom side of the drumstick resting surface 32 is attached securely to the tray base element 22. The tray base element 22 is preferably of a generally rectangular form with extended ears 29*a*, 29*b*, 30*a*, 30*b* at each corner extending collinear with the width of the generally rectangular base element 22. Linkage elements 23 are inserted between opposed ears 29*a*, 29*b* and 30*a*, 30*b* of the tray base and a linkage pin 31 is inserted therethrough. In this manner, a series of tray base/linkage combinations may be attached to form the entire tray conveyor chain 14. Arched grooves 34 (FIG. 9) are formed in the underside of each tray base and form protrusions therebetween, and the grooves and protrusions engage teeth formed in the idler sprocket 28 as the carrier trays move thereabout. Additionally, one side of the tray base upon which a tray is located is provided with a fixed pin 18 as seen in FIG. 9. The purpose and function of this fixed pin 18 will be described in more detail below.

Figure 14:
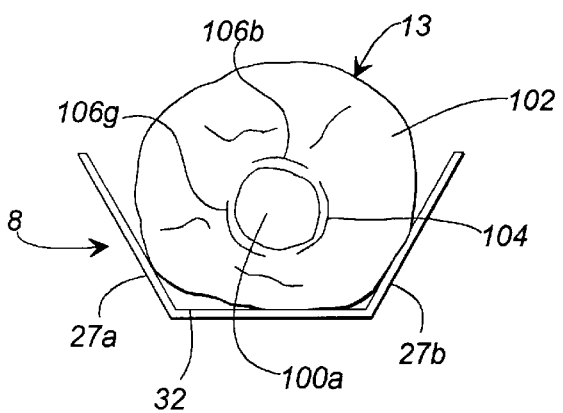
FIG. 14 is a schematic view of a drumstick that can be processed with the turkey drumstick deboner of FIG. 1.

As indicated above, each transverse tray 8 serves to support one part of a leg or a wing of poultry. In the preferred embodiment this tray 8 supports a turkey drumstick 13. These drumsticks 13 are characterized by a relatively thick proximal end 100*b* and a relatively thin distal end 100*a*. See FIG. 2, 13. More specifically, each turkey drumstick 13 includes an elongated drumstick bone 101 depicted by dashed lines in FIG. 2. Each elongated bone 101 is surrounded along its length by drumstick turkey meat 102. Drumstick bones 101 typically include a knuckle 103 at its relatively thin distal end 100*a*. As shown in FIG. 14, muscles 104 that are relatively flexible, a thick muscle 106*a* and a second thick muscle 106*b* are consecutively located at the distal end 100*a* in a circumferential direction. It is typically the presence of these thick muscle masses 106*a*, 106*b* that cause the drumstick meat 102 to cling to the drumstick bone 101 during a stripping operation. As such, a chief object of the present invention is to transversely cut these thick muscles 106*a*, 106*b* with a pre-cut device so that separating the meat from the bone of the drumstick can take place in a reliable manner. As seen in FIG. 2, the drumsticks 13 are loaded into the trays 8 by an operator such that the length of the drumstick 13 lays along the tray 8. As the drumsticks 13 are advanced through and out of the loading path 24, the drumsticks 13 are operated on by the pre-cut device.

Figure 11:
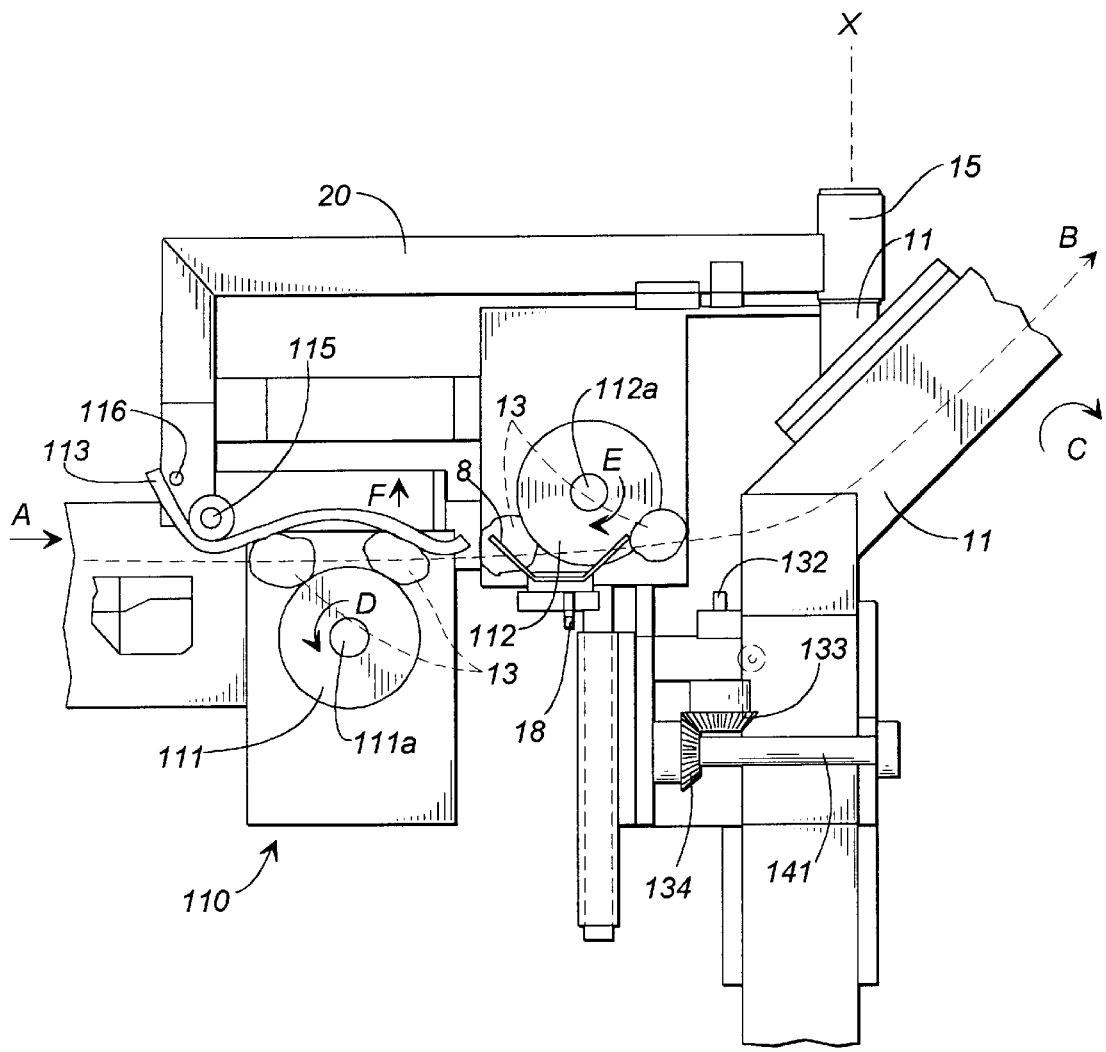
FIG. 11 is an isolated schematic side view of a pre-cut station for the turkey drumstick deboner of FIG. 1.

The deboning apparatus 10 of FIGS. 1–3 is thus provided with a pre-cut device 110 mounted on a frame 20 which, swiveling on a horizontal pivot, is attached to the framework 11 at the rotating bushing 15 (see FIG. 11). Whenever no drumsticks are processed with the deboner, frame 20 can be swung away horizontally, or possibly removed from the framework 11, in which case frame 20 is arranged on framework 11.

Attached on frame 20 are a first circular knife 111 and a second circular knife 112 which are rotatable in the directions D and E respectively, by means of drive shafts 111*a*, 112*a*. These shafts 111*a*, 112*a* are driven by motors 111*b* and 112*b* respectively. The circular knives 111, 112 are arranged in such a way that their cutting edge cuts through, or touches, the horizontal plane S (see FIG. 2). The circular knives and their drives are mounted on frame 20, the heights of their position being adjustable in order to adopt an optimal position for each shape of drumstick. A guide 113 is arranged above the front and lower placed first circular knife 111; it shows a curve which is about the same as the curvature of the edge of circular knife 111 and which at location 114 is biased downwards by means of a torsion spring 115 against upward displacement in the direction F. In this way, a suitable basic setting is attained of the distance between guide 113 and the edge of circular knife 111, both thick and thin drumsticks ends 100*a* can be cut in a correct way with blade 111 and the ends 100*a* are slightly pushed against the circular knife 111 so that the back side too is within reach of the blade. Downward movement of guide 113 past the starting position is hampered by stop 116. As a result, a defined minimum distance is ensured between the blade edge and the guide 113. In addition, protective bars 117 and 118 are arranged for safety reasons.

As can be seen in FIG. 14, the drumsticks 13 are thus placed in the trays 8 such that the muscle strands 101 face up and down. In that the guide 113 also presses the end 100*a* slightly against the edge of the circular knife 111, these muscle strands can be cut for their greater part when passing the circular knife 111 in place T (see FIG. 13). Moreover, as shown in FIG. 2, the thick muscle 102*a* is cut through by circular knife 111. The second circular knife 112 cuts through the topmost part of muscle strand 101 and subsequently through the second thick muscle. Cutting of the rearward, upper muscles is further advanced by the fact that the conveyor chain other than shown in FIG. 1 is reset in the passage path Q and no longer moves in direction A but slants upwards, in direction B (see FIG. 11). This path practically coincides with the revolving track of C of the large toothwheel.

In the transition area between the track in direction A and the track in direction B, and immediately after the second circular knife 112 a mechanism is provided with which the drumstick end 100*a* which during incision is projecting from the edge of the tray 8, can be pushed back.

Figure 12:
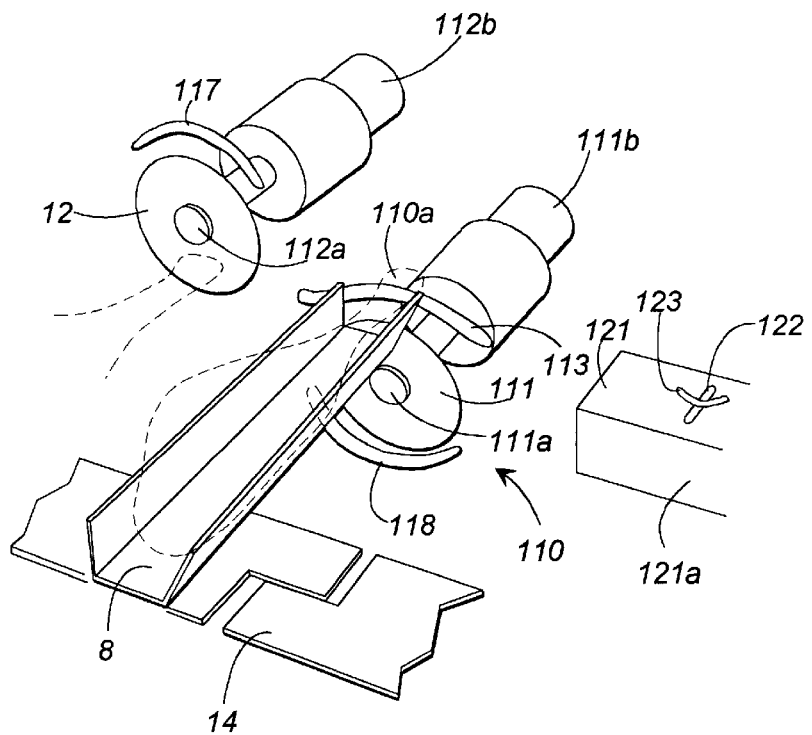
FIG. 12 is a partial perspective view of the pre-cut station of FIG. 11 during operation.

By placing the drumsticks 13 in trays 8 in such a way that the ends 100*a* project sufficiently to be engaged by the circular knives 111 and 112, use can be made of a supporting element formed by an adjustable stop attached to a shelf of framework 11, which shelf extends in front of and parallel to the tray conveyer chain 14 at the horizontal insertion path. This stop can be formed for example, by an angular profile 121 (see FIG. 12) provided with a pair of transverse grooves 122 (one is shown) through which pivots 123 are placed, which reach into the apertures in the aforementioned shelf part and with which the profile 121 can be fastened. The shifted, downward hanging part of the angular profile then serves as a stop. During the insertion of the drumsticks, the operator places the end 100*a* against part 121*a* of the angular profile and then inserts the thick part 100*b* of the drumstick end down in the tray 8 with the thin elongated side facing down.

Figure 4:
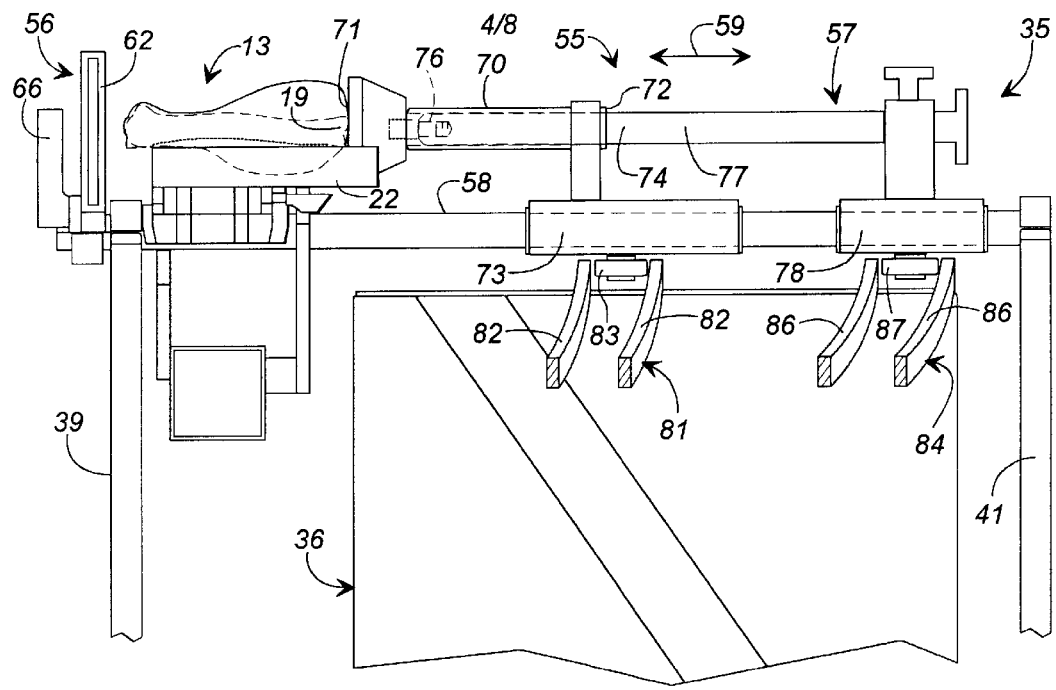
FIG. 4 is a side view of a deboning module showing its relationship with the cam drum and a carrier tray of the tray conveyor.

Those sides of the chain links 22 of the conveyer chain 14 upon which the trays 8 are located are provided at a side facing a loading side with a fixed pin 18, as seen in FIG. 4. This fixed pin 18 reaches far enough to abut a stationary lever 131, which lever is for co-turning purposes attached to a vertical pivot 132 of swivel plate 130 which in a spaciously advantageous way is located mainly underneath the track of the drumsticks and the trays. The pivot 132 has bearings in block 135, fixedly attached to the frame 20 so that the swivel plate 130 follows the aforementioned pre-cut mechanism. Vertical pivot 132 has, at its lowermost part, a horizontal conical toothwheel 133, engaging a vertical conical toothwheel 134, mounted on a horizontal pivot 141, also housed in block 135. In a secured way for rotation, a stainless steel plate 136 is also mounted on pivot 141. Due to the influence of gravity, the plate 136 is usually located in a substantially horizontal position, shown in thick lines. In this portion, the plate 136 rests on fixed support 139.

Figure 13:
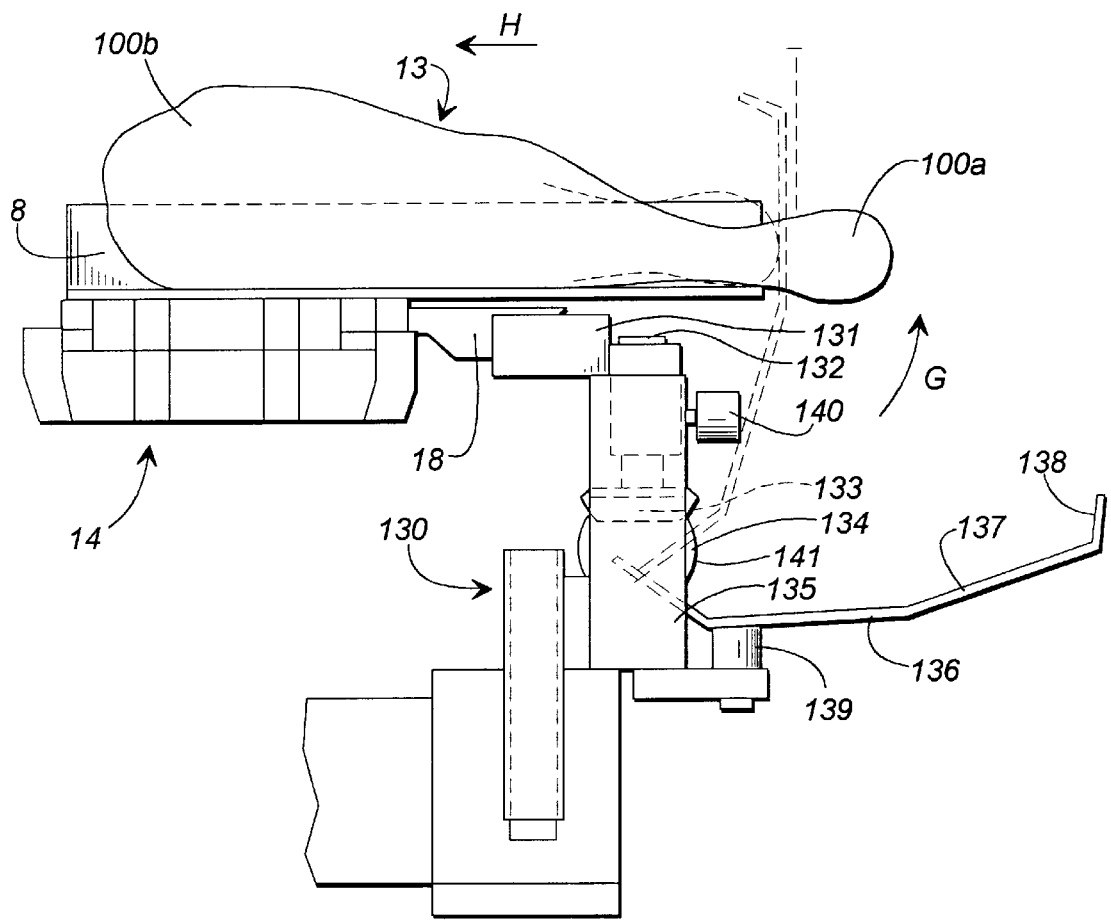
FIG. 13 is a detailed drawing of an apparatus for returning pre-cut drumsticks into their trays.

Once a tray 8 with a drumstick 13 has just passed the second circular knife 112 and the distal drumstick end 100a has just been cut behind the knuckle 103 to loosen the muscles from the bone (according to the schematically drawn plane T as shown in FIG. 13), the pin 18 abuts the lever 131 and by the force exerted on the tray conveyer chain 14, the pin 18 pushes this lever 131 so that the vertical pivot 132 is rotated and, through the conical toothwheels 133 and 134, the horizontal pivot 141 is also rotated. Rotation of the horizontal pivot 141 will cause the plate 136 to rotate upwards in direction G until it touches a fixed abutment 140. During this movement, a face portion 137 will touch the end of the drumstick 100a and will move the drumstick 100 back on the tray 8, in direction H. Abutment 140 ensures that the face portion 137 does not touch the moving tray 8. Further, at its end, plate 136 is provided with a bent end part 138 preventing the distal end 100a of drumstick 13 from reaching beyond the upper edges of the tray 8 and so, as a result of the friction between drumstick 13 and plate 136, lies diagonally with the end 100a towards the back, on/in tray 8, in which case the position of the drumstick 13 is not correct for further processing in the filleting machine.

In the position of plate 136, shown in the dash-dot line, the lever 131 has been turned far enough for the pin 18 to move beyond the lever 131. Further, it is important that the plate face portion 137 has such a length (in the drawing plane) and width (perpendicular to the drawing plane) that a slightly slanting upward movement in the transition area of direction A towards direction B, does not cause reduced engagement between the face portion 137 and the drumstick distal end 100a.

As shown in FIGS. 1–3, a deboning unit 35 is positioned downstream of the insertion path 24 of the tray conveyor chain 14 and the precut device 10. The deboning unit 35 is mounted to and supported by the support framework 11, with the tray conveyor chain 14 extended and revolving thereabout. The deboning unit 35 includes a substantially cylindrical stationary cam drum 36 affixed in a stationary position to the support frame by axle 42. The cam drum 36 is formed from steel or similar rigid material and a revolving carrier assembly 38 is rotatably mounted about the cam drum. The carrier assembly 38 includes a pair of rotatory end plates 39 and 41 mounted adjacent the opposite ends of the cam drum 36, as illustrated in FIG. 3, with the end plates being spaced from the cam drum 36. Each of the end plates is a circularly shaped disk formed from steel or similar material and is each rotatable with respect to the cam drum 36 about the axis of rotation 40, coincident with axle 42, in the direction of the processing path 16.

The rotary end plates 39 and 41 are rotatably mounted on the axle 42 that extends through the cam drum 36 and through the rotary end plates, and the axle 42 is connected at its ends 43 to the supporting framework 11. A sprocket 46 is mounted about the axle 42 adjacent end plate 41 and is attached to the end plate 41. As illustrated in FIGS. 1–3, a drive motor 47 is mounted to the framework, adjacent an end of the drive shaft. The drive motor 47 includes a drive shaft that drives a drive sprocket 49. The drive sprocket 49 engages the sprocket 46 attached to end plate 41 in a driving relationship such that as the drive motor rotates its drive shaft, the drive sprocket is rotated in engagement with the sprocket, which in turn causes the deboning unit 35 to revolve about the cam drum 36.

A number of meat stripper disc assemblies 56 rotate together with the carrier assembly 38 in the direction C, which stripper assemblies 56, as shown, are positioned before the conveyor chain 14, and an equal number of bone pusher assemblies 57, positioned at the opposite side of the conveyor chain 14. The bone pusher assemblies 57 are provided with cam followers 83, 87 which extend radially inward and engage curved cam tracks 81, 84 on a cam drum 36. The cam followers and the bone pusher assemblies connected therewith are arranged in such a way that in the drawing plans they are perpendicularly slidable, towards and away from the meat stripper assemblies 56. This is described in greater detail below.

Figure 5:
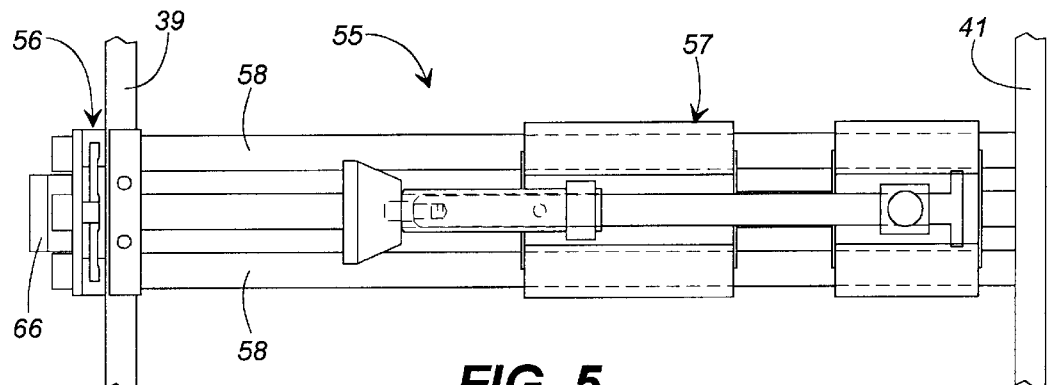
FIG. 5 is a top view of a deboning module, similar to FIG. 4.

As best shown in FIGS. 2, 4 and 5, a series of deboning modules 55 are supported by the end plates 39 and 41 and are arranged in spaced series about the circumference of the cam drum 36. Each of the deboning modules includes a pair of travel rods 58 mounted at their ends to end plates 39 and 41, a meat stripper disk assembly 56 mounted at one end of the pair of travel rods and a bone pusher assembly 57 that moves along the travel rods. The travel rods are arranged parallel to one another and to the axle 40 and typically are formed from steel or similar metal, and are mounted to and extend between the end plates 39 and 41, arranged in pairs.

As FIGS. 1 and 3 indicate, the tray conveyor chain 14 extends over and about the travel rods 58 of the deboning modules 55 of the deboning unit 35, with the arched depressions 34 (FIG. 8) of the carrier trays in engagement with the travel rods 58 so as to move with the movement of the deboning modules about the cam drum. The travel rods thus act as a drive sprocket that engages and drives the continuous tray conveyor chain 14 about its processing path.

Figure 6:
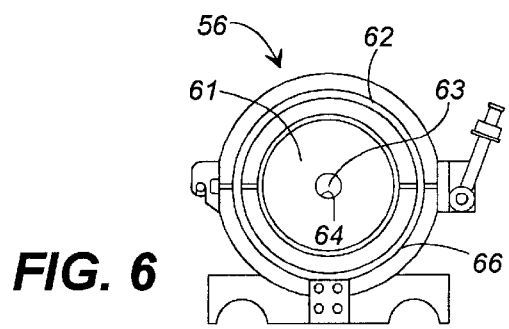
FIG. 6 is a side elevational view of a meat stripper assembly.

FIGS. 4–6 illustrate the deboning module 55 with its meat stripper disk assembly 56 and bone pusher assembly 57 in greater detail. As FIGS. 4 and 5 illustrate, the meat stripper disk assembly 56 of each deboning module 35 is mounted to a pair of travel rods 58 in spaced series from one another about the circumference of the front rotatory end plate 39. As deboning unit 35 revolves about cam drum 36, each carrier tray 22 of the continuous tray conveyor 14 is moved onto a pair of travel rods and into alignment with a meat stripper disk assembly 56 and is maintained in alignment with the meat stripper disk as it is revolved about the cam drum of the deboning unit. As shown in FIG. 6, each meat stripper disk assembly 56 includes a flexible stripper disk 61 formed from rubber or similar resilient material mounted in a holder 62 that is attached to the ends of a pair of travel rods 58. An aperture 63 is formed in the center of each stripper disk 61 and includes a substantially circular stripper edge 64. The aperture of each stripper disk becomes aligned with the semi-cylindrical recess 32 of a carrier tray as the carrier tray and aligned meat stripper disk are moved in timed relationship about the cam drum.

The aperture 63 of the stripper disk 62 receives the bones of the poultry drumsticks 13 (or other poultry part), with the stripper edge 64 of the aperture on the side of each stripper disk that faces the carrier trays 22 being chamfered to aid in the passage of the poultry bones therethrough. Each stripper edge 64 of each aperture 63 snugly engages the bone of each poultry drumsticks and retards the passage of the drumstick meat through the aperture. As a consequence, the drumstick bones pass through the apertures and the meat of the poultry drumstick is progressively stripped from the drumstick bones.

As shown in FIG. 6, the holders 62 of each meat stripper disk assembly 56 are substantially circular metal frames circumscribed about the outer edge of each stripper disk 61. The holders function to hold the stripper disks in place as the drumstick bones are urged through the apertures of the stripper disks during a stripping operation. The holders thus ensure that the flexible stripper disks do not collapse or are pushed rearwardly by the drumstick bones during a stripping operation.

A circular bone guide 66 is mounted to the stripper disk assembly 56, positioned behind each stripper disk 61 and encircling the aperture formed within each stripper disk. The bone guides 66 define a central opening of a sufficient diameter to enable the knuckle 103 of each drumstick bone 101 to pass therethrough without interfering, but yet restrict excess movement of the drumstick bones from side to side or vertically during the stripping and separation of the meat therefrom, as shown in FIGS. 5–7.

As shown in FIGS. 4 and 5, each bone pusher assembly 57 is slidably mounted on a pair of travel rods 58, initially positioned in a position retracted from its meat stripper disk assembly 56, and aligned with the semi-cylindrical recess 32 formed in the carrier tray 22 of the continuous tray conveyor 14. Each bone pusher assembly 57 includes a hollow substantially cylindrical pusher sleeve 70 having an open front end 71 and an open rear end 72 and is mounted upon a carrier block 73. The carrier block 73 is slidably mounted on the travel rods 58 to enable the pusher sleeve 70 to be moved laterally toward and away from its stripper disk assembly 56 in the directions of arrow 59 into engagement with a poultry drumstick 13 positioned on its carrier tray 22.

A cylindrical pusher rod 74 is received and extends through each pusher sleeve 70, projecting rearwardly from the rear end 72 of each pusher sleeves. Each pusher rod 74 is slidably mounted within its pusher sleeve 70 and has a protruding portion 76 that telescopes into and out of the front end 71 of each pusher sleeve 70 to engage and urge the large knuckle end 103 of the drumstick bone 101 through the aperture 63 of its aligned stripper disk 61, and a rear end 77 extends out the open rear end of each pusher sleeve 70. The rear end 77 of each pusher rod 74 is mounted to a carrier block 78 that is slidably mounted on the travel rods 58 for moving the pusher rod laterally in the direction of arrow 59 toward engagement with the drumstick bone.

As shown in FIGS. 2 and 4, a first cam track 81 is formed about the cam drum 36 of the deboning unit 35, positioned beneath the pusher sleeve 70 of the deboning modules 55. The first cam track extends helically about the circumference of the cam drum and includes a pair of parallel upstanding side walls 82. A cam follower 83 is mounted to the bottom of the carrier block 73 of each pusher sleeve 70 and is received and rolls along the side walls 82 of the first cam track 81 as the deboning modules are revolved about the cam drum. As the cam followers 83 engage and roll along the first cam track, the pusher sleeves 70 are moved laterally in the direction arrow 59 toward and away from the carrier trays, causing the pusher sleeves to engage and urge the poultry drumsticks 13 toward their aligned meat stripper disk assemblies 56.

A second helical cam track 84 is formed about the cam drum 36 of the deboning unit 35, extending generally parallel to the first cam track 81 and having parallel upstanding side walls 86. A cam follower 87 is mounted to the bottom of each carrier block 78 for each pusher rod 74 and engages and rolls along side walls of the second cam track 84 as the deboning modules are revolved about the cam drum. As the cam followers 87 of the carrier block 78 roll along the side walls 86 of the second cam track 84, the pusher rods 74 are moved in the direction of arrow 59, moving with their pusher sleeves 70 to engage and urge the drumstick bones through the stripper disks 61, and to return to a retracted position.

As illustrated in FIG. 4, the first and second cam tracks 81 and 84 curve and extend diagonally toward the tray conveyor 22 as they extend around the cam drum 36 of the deboning unit 35, to cause the bone pusher assemblies 56 to move along their travel rods 58 into engagement with the poultry drumsticks 13 on the carrier trays 22 during a meat stripping operation. The cam tracks then extend along a substantially straight path as the drumsticks bones 101 are pushed through the apertures 63 of the stripper disk 61 and are separated from the drumstick meat to complete the stripping operation. Thereafter, the cam tracks 81 and 84 begin to curve and extend diagonally away from the tray conveyor 22 (not shown) to cause the bone pusher assemblies 55 to return to their retracted, loading positions where the bone pusher assemblies 57 are withdrawn from over the continuous tray conveyor chain 14, allowing the conveyor chain to move away from and toward engagement with the deboning unit 35.

Typically, as the drumstick bones and drumstick meat are separated, they are dropped out of the bottom of the deboning device 10. A removal conveyor (not shown) or other collection means can be positioned below the deboning device 10 so as to catch the drumstick bones and meat for collection and removal for inspection and further processing as needed.

Figure 10:
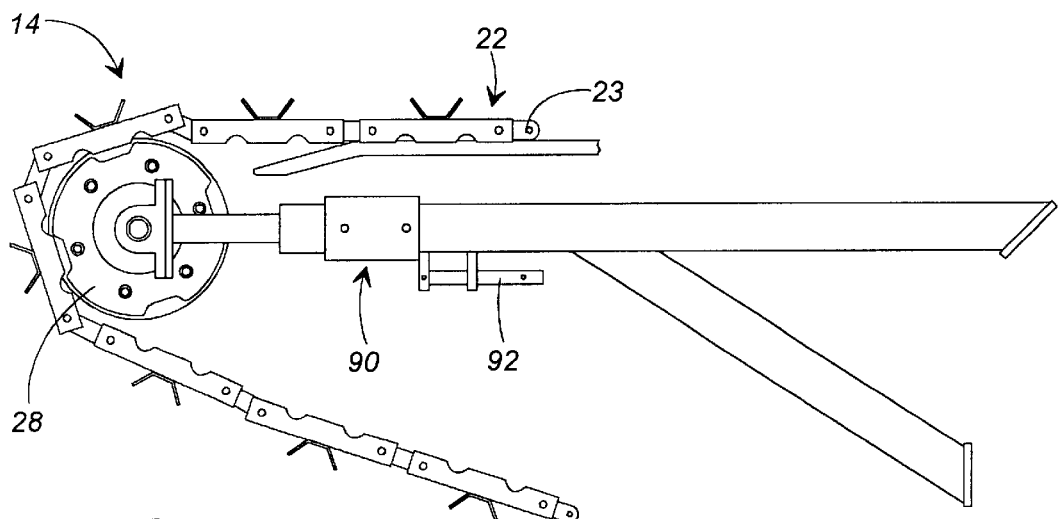
FIG. 10 is a side view of a portion of the continuous tray conveyor.

As illustrated in FIGS. 1 and 10, a conveyor tensioner 90 is mounted to the support framework 11 adjacent the loading end 26 of the tray conveyor chain 14. The tensioner generally includes a bracket 91 slidably mounted to the framework and attached at one end to the idler sprocket 28 of the tray conveyor. A travel screw 92 is attached to the bracket for moving the extension bracket longitudinally with respect to the framework to move the idler sprocket of the tray conveyor longitudinally in order to take up or create slack within the tray conveyor.

In addition, the construction of the deboning device 10 of the present invention advantageously enables the expansion of the tray conveyor chain 14 by the addition of extra carrier trays 22 to the tray conveyor and a longer extension bracket 90 to the framework. As a result, the quantity of carrier trays 22 on the tray conveyor can be increased so that more than one operator can be stationed at the loading run 24 to enable increased numbers of poultry parts, particularly drumsticks, to be loaded onto the deboning device. As a result, the number of parts being processed through the deboning device can be significantly increased and the speed of revolution of the carrier assembly about the cam drum accordingly increased to increase the production capacity of the deboning device.

Therefore, it will be understood by those skilled in the art that while the present invention has been disclosed with reference to a preferred embodiment, various modifications, changes and additions can be made thereto without departing from the spirit and scope of the invention.

We claim:

1. A poultry processing apparatus for removing the bone from the drumstick of a bird comprising:
   a stationary cam support;
   a continuous cam track means extending about said cam support;
   a revolving carrier assembly surrounding said cam support and including a continuous series of deboning modules spaced about said cam support and movable along said cam track means;
   each of said deboning modules including a meat stripper means and a reciprocatable bone pusher engaging said continuous cam track means and movable toward and away from said meat stripper means in response to revolving about said cam track for engaging and pushing a drumstick bone through said meat stripper means;
   a drive means for revolving said carrier assembly about said stationary cam support;
   a means for transversely cutting a muscular tissue of the bird drumstick prior to the bird drumsticks engaging said deboning modules;
   a continuous tray conveyor including a plurality of poultry drumstick carrier trays arranged in spaced series for transporting poultry drumsticks into communication with said deboning modules;
   conveyor guide means for guiding each of said carrier trays along a substantially rectilinear loading path toward said revolving carrier assembly, about said revolving carrier assembly, and along a return path to the loading path;
   so that poultry drumsticks are loaded on said carrier trays as the carrier trays move along the loading path, the carrier trays move from the loading path and about the revolving carrier assembly and guide the drumsticks into contact with said cutting means and also into registration with said deboning modules, the cam track actuates the bone pushers to push the bones through the meat strippers as the carrier trays move with the revolving carrier to strip the meat from the bones of the drumsticks, and the carrier trays move away from the revolving carrier along the return path.

2. The poultry processing apparatus of claim 1 and wherein:
   said stationary cam support comprises a cylindrical cam drum having a longitudinal axis extending substantially horizontally;
   said revolving carrier includes end plates positioned at opposite ends of said cam drum rotatable about the longitudinal axis of said cam drum;
   said deboning modules each including at least one travel rod connected at its ends to said end plates, at least one cam follower block movable along said travel rod in response to engagement with said cam track and movement about said cam drum, said reciprocatable bone pusher being mounted to and movable with said cam follower block between a position extending across a carrier tray and a position retracted from across a carrier tray;
   so that the bone pushers are out of the way of the tray conveyor as the tray conveyor moves into and out of engagement with the revolving carrier assembly and are extended across the tray conveyor as the carrier trays move about the revolving carrier.

3. The poultry processing apparatus according to claim 1, wherein said cutting means is movable away from said continuous conveyor such that the poultry drumsticks are not cut prior to engaging said deboning modules.

4. The poultry processing apparatus according to claim 1, wherein said cutting means comprises:
   a first means for cutting the muscular tissue at a first part of the poultry bone circumference; and
   a second means for cutting the muscular tissue at a complementary second part of the poultry bone circumference,
   wherein said first and second cutting means are positioned along said processing path such as to transversely and circumferentially cut muscular tissue connected to the drumstick bone near a distal end of the drumstick bone.

5. The poultry processing apparatus according to claim 4, wherein said first cutting means engages at least a lower part of the drumstick bone circumference and said second cutting means engages at least an upper part of the drumstick bone.

6. The poultry processing apparatus according to claim 5, wherein said first and second cutting means comprise a first and a second circular knife respectively, said circular knives positioned in a vertical plane adjacent and offset with regard to each other.

7. The poultry processing apparatus according to claim 6, wherein a guiding element has been placed adjacent to at least one of said circular knives at a radial distance therefrom, said guiding element for pushing the poultry drumsticks against said circular knife.

8. The poultry processing apparatus according to claim 7, wherein the first cutting means, seen in the process direction, is located upstream and lower than the second cutting means, and wherein said guiding element is placed over the first cutting means.

9. The poultry processing apparatus according to claim 8, wherein the guiding element, seen in the process direction, extends beyond the rotation axis of the first cutting means and preferably extends for at least that part of the first cutting means' circular knife's circumference that is facing the second cutting means.

10. The poultry processing apparatus according to claim 9, further comprising an means for sliding the drumstick along a bottom surface of the carrier tray, away from said vertical plane of said first and second cutting means.

11. A process of removing bones from poultry drumsticks and similar edible bone and meat parts, comprising the steps of:
    moving a plurality of poultry drumsticks in series first along a loading path toward a pre-cut device;
    cutting the poultry meat away from the bone with a pre-cut device, said cutting for facilitating removal of the poultry meat;
    moving said plurality of poultry drumsticks away from said pre-cut device and toward a deboning unit;
    revolving the poultry drumsticks about the deboning unit, with each drumstick extending transverse to the direction of movement;
    as the poultry drumsticks revolve about the deboning unit urging the bone of each poultry drumstick longitudinally through an aperture formed in a meat stripper disk assembly of said deboning unit;
    as each bone is urged through the aperture of a meat stripper disk assembly, retarding the movement of the meat with the stripper disk assembly to separate the meat from the bone; and
    urging the trailing end of the bone on through the aperture of the meat stripper disk assembly while retaining the meat at the meat stripper disk assembly to complete the removal of the meat from the bone.

12. The process of claim 11, wherein the step of moving a plurality of poultry drumsticks in series along a processing path, first along a loading path toward a precut device, and then away from said precut device and toward a revolving deboning unit and then revolving the poultry drumsticks about a deboning unit comprises placing each poultry drumstick within a tray attached to a carrier tray base, and moving the trays first along a rectilinear loading path, past the precut device, and then in an arcuate path about a deboning unit.

13. The process of claim 12, further comprising the step of sliding said poultry drumsticks along a surface of said tray such that the drumstick is withdrawn from said precut device.

14. Apparatus for pre-cutting separate leg parts of poultry prior to deboning the leg part, said pre-cutting apparatus adjacent to a continuous conveyor deboning device and comprising:

a first means for transversely cutting a muscular tissue of the poultry leg part at a first part of a leg bone circumference;

a guiding element placed above said first cutting means for pushing the poultry leg against said first cutting means, said guiding element biased towards said first cutting means by a spring element; and a second means for transversely cutting a muscular tissue of the poultry leg at a second part of the leg bone circumference, said second cutting means positioned higher than said first cutting means.

15. The precutting apparatus according to claim 14, wherein said first and second cutting means are defined by two circular knives which, seen in the direction of transport, are placed in a vertical plane, next to and offset with regard to each other.

16. The precutting apparatus according to claim 15, wherein the guiding element, seen in the process direction, extends beyond the rotation axis of the first cutting means and also extends for a portion of the first cutting means' circular knife's circumference that is facing the second cutting means.

17. The precutting apparatus according to claim 16, wherein said guiding element is curved with a curvature, said curvature substantially equal to a curvature of said first cutting means.

18. An apparatus for deboning poultry parts, said apparatus comprising:

an endless conveyer for the poultry parts;

a means for sequentially moving said conveyor through a loading path, a deboning path, and a return path;

a plurality of supports along said endless conveyer, one support for each part, said supports placed transversely to a direction of movement of said conveyor;

a pre-cut station adjacent to said conveyer at a passage from the loading path to the deboning path of the conveyor, said pre-cut station engaging said poultry parts such as to partially separate a muscle tissue from a poultry part bone; and a deboning means having a plurality of deboning modules along the deboning path of said conveyor, said deboning modules moving to correspond with the movement of said conveyor, each of said deboning modules including a meat stripper means and a reciprocatable bone pusher movable toward and away from said meat stripper means for engaging and pushing a poultry part bone through said meat stripper means.

* * * * *